United States Patent Office 3,526,610
Patented Sept. 1, 1970

3,526,610
AROMATIC POLYIMIDES CONTAINING BOTH ACETAMIDE AND CARBOXYLIC ACID RADICALS AND CROSS-LINKED POLYMERS OF SAME
George M. Bower, Pittsburgh, Pa., assignor to Westinghouse Electric Corporation, Pittsburgh, Pa., a corporation of Pennsylvania
No Drawing. Continuation of application Ser. No. 420,820, Dec. 23, 1964. This application Feb. 19, 1968, Ser. No. 706,709
Int. Cl. C08g 20/32
U.S. Cl. 260—65      10 Claims

ABSTRACT OF THE DISCLOSURE

Linear aromatic polyimide resins having acetamido and carboxylic acid groups along the polymer chain and fully cured cross-linked polymers of the above resins, said polymers being useful as laminates.

---

This application is a continuation of application Ser. No. 420,820, filed Dec. 23, 1964, now abandoned.

The present invention relates to thermosetting aromatic polyimide resinous compositions. More particularly, the invention relates to a novel method of cross-linking aromatic polyimides by the incorporation in the polymer chain of acetamido and carboxylic acid side groups. The invention relates to soluble polymeric intermediates, insoluble imidized polymeric intermediates, cross-linked polyimides, to the method of their production, and to their use.

It has been recognized in the art that linear aromatic polyimide resinous compositions have outstanding thermal stability. This property has rendered this class of resins commercially desirable for use as high temperature wire enamels, films, laminate adhesives, and the like uses. The prior art polyimides, however, are thermoplastic and thus subject to loss of strength near their softening point. An intermediate thermoplastic stage is necessary for fabrication but undesirable in a finished laminate designed for use at a high temperature. These characteristics, while not completely undesirable, have detracted from the usefulness of the linear polyimides.

It is an object of the present invention to provide a class of aromatic polyimides which are thermosettable.

A further object of the invention resides in the provision of a novel method of preparing cross-linkable aromatic polyimides.

A further object resides in the provision of novel soluble and fusible resinous intermediates which, upon curing, become cross-linked and are insoluble and infusible.

Other objects of the invention will become apparent from the following detailed description thereof.

Generically, the invention relates to the preparation of cross-linkable aromatic polyimides. The cross-linking is effected by incorporating in the intermediate linear polymer chain acetamido and carboxylic acid groups. Upon final curing the so-prepared polyimides become thermoset and insoluble. In the preparation of the resins of the invention, there are first prepared novel soluble polymeric intermediates having the general Formula I:

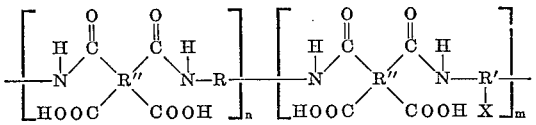

wherein $n$ is an integer, $m$ is at least 1, and the sum of $n$ and $m$ is at least 5, R is a divalent aromatic radical, R' is a trivalent aromatic radical, X is selected from the group consisting of acetamido and carboxylic acid radicals, and R" is a tetravalent aromatic or cyclic radical. In the formula, the ratio $n/m$ is 0 to 20. These linear polymers are soluble in such solvents as dimethylacetamide (DMAC), N-methyl pyrrolidone (N-MP), dimethyl sulfoxide (DMSO), and the like. The soluble intermediates have outstanding utility in preparing high temperature laminates, adhesives, molding compositions, and the like uses. Upon heating at a moderate temperature, the novel soluble intermediates become imidized and have the general formula (II) 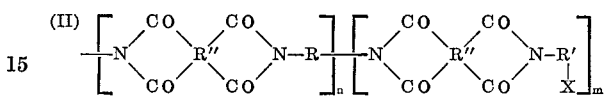

wherein $n$, $m$, R, R', R", and X have the values stated in Formula I. It will be appreciated that the tetravalent radical R" has its four bonds so located that the imide rings contain 5 to 6 members depending on the configuration of the aromatic or cyclic radical.

In practicing the invention, the novel soluble intermediates are prepared by mixing an aromatic diamine and at least one aromatic or cyclic dianhydride in a solvent, such as those set forth above, in the presence of the selected amounts of acetamido and carboxylic acid-containing compounds. The acetamido and carboxylic acid groups are incorporated into the polymer by means of their mono- or diamino derivatives. The initial reaction between the dianhydride and amine groups takes place at room temperature over a period of from several minutes to several hours. The reaction is preferably carried out with the employment of a slight molar excess of either the total diamine content or dianhydride so that the polymer becomes end-blocked at the desired point. Additionally, there may be employed small amounts of monoamines as end-blocking agents for viscosity control. Such compounds include m- and p-aminobenzoic acid, m- and p-aminocetanilide, as well as trimellitic anhydride, aniline, and phthalic anhydride. It is preferred that the resin-solvent solution be within the range of about 20–50 stokes at 22–30% solids for use in impregnating and coating.

Aromatic diamines suitable for use in practicing the invention include m-phenylenediamine (MPD), p-phenylene-diamine (PPD), 4,4'-diaminophenyl ether (DAPE), 3,4' - diaminobenzanilide, 4,4'-diaminobenzanilide, 4,3'-diaminobenzanilide, 4,4'-diaminophenylsulfide (DAPS), 3,3'-diaminobenzanilide, methylenedianiline (MDA), and the like.

Pyromellitic dianhydride (PMDA) and benzophenone tetracarboxylicdianhydride (BTDA) are two dianhydrides commonly employed. Other dianhydrides which may be used include cyclopentanetetracarboxylicdianhydride, naphthalene, naphthalenetetracarboxylicdianhydrides and the like.

Typical mono- and diamino acetamido compounds include 2,4-diaminoacetanilide, 3,5-diaminoacetanilide, 3,5 diamino-4-acetamidobenzanilide, 3,5 - diamino - 4' - acetamidobenzophenone, 0 - (3,5 - diaminobenzoyl) - 4 - hydroxyacetanilide, 2,4-diamino-4'-acetamidophenyl ether, 3,5-diamino-4'-acetamidobiphenyl, and the like.

Preferred carboxylic acid compounds include 3,5-diaminobenzoic acid, m- and p-(3,5-diaminobenzamido) benzoic acid, 3,5 - diaminobenzophenone - 4' - carboxylic acid, 2,4-diaminobenzophenone-3'-carboxylic acid, m- and p-(2,4-diaminophenoxy) benzoic acid, and the like.

As stated above, the total diamine and dianhydride components are adjusted so as to be present in nearly stoichiometric proportions. The acetamido- and carboxylic acid moieties are also so selected as to provide $n$ and $m$ in the ratio of $$\frac{n}{m} = 0 \text{ to } 20$$

It should also be borne in mind that the groups $n$ and $m$ occur in random distribution in the polymers. Ultimate cross linking occurs through the acetamido and carboxylic acid groups by forming amide links and liberating acetic acid.

In preparing, for example, a laminate from the novel polymers, a solution of resin of Formula I is adjusted to the desired viscosity and sheets of material such as glass cloth are impregnated therewith. The treated material is then heated at a temperature of about 100°–200° C. to remove the solvent and cause imidization of the polymer. At this point the resin has the structural configuration of Formula II. The treated sheets are dry to the touch and may be stored indefinitely. Thereafter, a plurality of the sheets are stacked and consolidated at a temperature of about 200°–425° C. and a pressure of about 200–2000 p.s.i. Obviously, the sheet material may be impregnated in a continuous operation where desired. The laminate so prepared is characterized by outstanding flexural strength and thermal stability.

The invention will be further particularized by the following detailed examples. It is to be understood, however, that the examples are given solely for the purpose of illustration.

EXAMPLE I

A solution was prepared by dissolving 243 g. of m-phenylene diamine (MPD) (2.25 moles), 7.5 g. (.05 mole) of p-aminoacetanilide PAA, 6.86 g. (.05 mole) of m-amino-benzoic acid (MAB), 56.8 g. (.2 mole) of 3,5 - diamino - 4′-acetamidobenzanilide (DAB-PAA), and 30.4 g. of 3,5-diamino-benzoic acid (DAB) (0.2 mole) in 2640 g. of dimethylacetamide (DMAC). Ths solution was stirred and a total of 822 g. of 3,4,3′,4′-benzophenone-tetracarboxylicdianhydride (BTDA) (2.55 moles) was added. The last 50 g. of BTDA was added in 5 g. increments over a 22-hour period.

Sheets of 181–A1100 glass cloth were hand-dipped in the above resin, were then air-dried for 90 minutes, and then cured in a forced draft oven at 150° C. for 20 minutes. A 12-ply laminate was prepared from these prepregs under a pressure of 200 p.s.i. and at a temperature of 370° C. for one hour. This laminate was 122.5 mils thick and contained 28.4% resin. The flexural strength at room temperature averaged 60,500 p.s.i. The flexural strength at 315° C. after aging at 315° C. is given in Table I.

EXAMPLE II

A solution was prepared by dissolving 162 g. of MPD, 72.4 g. of DAB, 135 g. of DAB-PAA, 6.84 g. of MAB, and 7.50 g. of PAA in 2020 g. of DMAC. This solution was stirred and 786 g. of BTDA was added together with 1900 g. of DMAC.

Sheets of 181–A1100 glass cloth were impregnated by hand-dipping in the resin. After dipping, the wet glass cloth was air-dried for 15 minutes and cured at 160° C. for 25 minutes. Two coats gave the desired resin build. A 12-ply laminate was prepared by pressing at 200 p.s.i. and 270° C. The flexural strength of 1″ x 4″ strips cut from this board averaged 59,000 p.s.i. when tested at room temperature. Flexural strength test values at 315° C. as a function of aging at 315° C. are given in Table I.

EXAMPLE III

A solution was prepared by dissolving 880 g. of MPD, 152 g. of DAB, 284 g. DAB-PAA, 27 g., and MAB, and 30 g. PAA in 10,700 g. DMAC. While stirring, 3,200 g. of BTDA were added. The last 200 g. were added over a period of 150 minutes, in 50 and 25 g. portions.

This resin was coated on 181–A1100 glass cloth 18 inches wide by continually passing the cloth through a dip tank containing the thinned resin, then up through a 6-foot vertical tower operating at about 100° C., and then finally through a 9-foot horizontal tower set at about 200° C. The cloth passed through at a rate of three inches per minute. Four passes were required to get the desired build.

Two laminates were prepared from this treated cloth. One was pressed under a pressure of 200 p.s.i. at a temperature of 370° C. This had a flexural strength of 57,000 p.s.i. and a flexural modulus of $2.7 \times 10^6$ p.s.i. A second board was pressed under a pressure of 1000 p.s.i. at 360° C. The flexural strength and modulus at room temperature was 63,200 p.s.i. and $3.3 \times 10^6$ p.s.i. respectively. The flexural strength and modulus at 315° C. as a function of aging of these two boards is given in Table II.

TABLE I.—FLEXURAL STRENGTH OF LAMINATES AT 315° AFTER AGING AT 315° C.

| Resin | Ex. 1 | Ex. 2 |
|---|---|---|
| Flexural strength (p.s.i.): | | |
| After 24 hours | 45,600 | 46,900 |
| After 250 hours | 18,700 | 18,800 |
| After 500 hours | 13,700 | 10,800 |
| After 750 hours | 10,300 | |

TABLE II.—LAMINATING STRENGTH AND MODULUS OF LAMINATES PREPARED FROM EX. 3 RESIN AT 315° C. AFTER AGING AT 315° C.

| | Laminating pressure (p.s.i.) | | | |
|---|---|---|---|---|
| | 200 | | 1,000 | |
| Flexural strength and modulus | FS | FM | FS | FM |
| After 0.5 hours | 39,800 | 1.9 | 56,200 | 2.4 |
| After 24 hours | 34,300 | 1.9 | 47,100 | 2.7 |
| After 100 hours | 21,800 | 2.5 | 26,000 | 2.8 |
| After 250 hours | 13,900 | 2.4 | 17,500 | 2.7 |
| After 500 hours | 10,300 | 2.4 | 10,000 | 2.3 |

EXAMPLE IV

A polyimide resin was prepared by dissolving 19.8 g. (0.01 mole) of methylene dianiline, 7.6 g. (0.05 mole) of DAB and 8.25 g. (0.05 mole) of diaminoacetanilide (DAA) in 360 g. of m-methyl pyrrolidone (N-MP) and adding first 21.8 g. (0.1 mole) PMDA and then a total of 34 g. (0.106 mole) BTDA.

This solution was diluted with 40 g. of N-MP and coated on a strip of glass cloth. After baking for one hour at 160° C. the treated cloth contained 31% resin and was flexible.

EXAMPLE V

A polyimide was prepared by dissolving 38.9 g. (0.18 mole) 4,4-diaminodisulfide, 1.52 g. (0.01 mole) DAB, and 1.65 g. (0.01 mole) DAA in 336 g. N-MP and adding with stirring a total of 45 g. (0.206 mole) of PMDA.

A strip of glass cloth dipped in this resin and baked at 160° C. for one hour contained 35% resin, was flexible, and suitable for laminating.

EXAMPLE VI

A polyimide resin was prepared by dissolving 36.15 g. (0.16 mole) 3,4′-diaminobenzanilide, 3.04 g. (0.02 mole) DAB, and 3.3 g. (0.02 mole) DAA in 344 g. N-MP, and then with stirring first 4.2 g. (0.02 mole) cyclopentanetetracarboxylic dianhydride and then a total of 45 g. (0.206 mole) PMDA.

A strip of glass cloth was dipped in the resin and baked out at 160° C. for one hour. The treated glass cloth was flexible, contained about 35% resin and was suitable for laminating.

EXAMPLE VII

A polyimide resin was prepared by dissolving 17.27 g. (0.08 mole) 4,4′-diaminodiphenylsulfide, 10.9 g. (0.066 mole) DAA, and 8.1 g. (0.054 mole) DAB in 214 g. N-MP and adding 2.3 g. (0.012 mole) of trimellitic anhydride with 43 g. (0.197 mole) PMDA.

A strip of glass cloth dipped in this resin and baked at

EXAMPLE VIII

A polyimide resin was prepared by dissolving 6.48 g. (0.06 mole) MPD, 13.6 g. (0.06 mole) 3,4'-diaminobenzanilide, 7.6 g. (0.046 mole) DAA, and 5.1 g. (0.034 mole) DAB in 231 g. N-MP and adding 2.3 g. (0.012 mole) trimellitic anhydride with 45.5 g. (0.208 mole) of PMDA.

A strip of glass cloth dipped in this resin and baked at 160° C. for one hour was flexible, contained 35% resin and was suitable for laminating.

EXAMPLE IX

A polyimide resin was prepared by dissolving 20 g. (0.1 mole) 4,4'-diaminodiphenyl ether, 7.6 g. (0.05 mole) DAB, and 8.25 g. (0.05 mole) DAA in 320 g. of N-MP and stirring in a total of 45 g. (0.206 mole) of PMDA. A strip of glass cloth dipped in this resin and baked out for one hour at 160° was moderately flexible, contained about 33% resin and was suitable for laminating.

EXAMPLE X

To a solution composed of 90 g. MPD (2.823 mole), 191 g. of DAB-PAA (0.672 mole), 102 g. DAB (0.672 mole), 4.1 g. MAB (0.03 mole) and 4.5 g. PAA (0.03 mole) dissolved in 260 g. DMAC a total of 715 g. BTDA (2.2 mole) was added. This is equivalent to about a 1.4% excess of anhydride.

This solution was diluted with 900 g. DMAC and then coated on 181/A1100 glass cloth. Four coats were applied and after each coat the treated cloth was baked in a circulating oven for 30 minutes at a temperature rising from 145–160° C. This treated glass cloth contained 35.0% resin. A 12-ply laminate was prepared by pressing under 200 p.s.i. at 350° for one hour.

The flexural strength and modulus of this laminate at room temperature was 58,500 p.s.i. and 3.1 p.s.i. respectively. The values at 315° C. as a function of aging at 315° C. are given in Table III.

EXAMPLE XI

To a solution composed of 135 g. MPD (1.25 moles), 95 g. DAB (0.625 mole), and 103 g. 2,4 DAA (0.625 g.) dissolved in 2650 g. of DMAC a total of 820 g. of BTDA (2.54 moles) was added.

This resin was coated on 181/A1100 glass cloth by use of the treating tower described in Example III. One pass through the tower gave the desired build.

One 12-ply laminate was prepared from this treated cloth by pressing at 200 p.s.i. and 370° C. for 30 minutes. This laminate had a final resin content of 38.8%. Initial room temperature, flexural strength and modulus were 63,600 p.s.i. and 2.9 p.s.i. respectively, Flexural strength and flexural modulus as a function of aging are given in Table III.

Treated cloth from the same tower was precured by heating for 15 minutes at 285° C. and then made into a laminate using the same conditions as the previous board. The initial flexural strength and modulus were 51,800 p.s.i. and $2.4 \times 10^{-6}$ respectively. Flexural strength and modulus at 315° C. as a function of aging at 315° C. are given in Table III.

TABLE III.—FLEXURAL STRENGTH AND MODULUS AT 315° C. AFTER AGING AT 315° C

| | Example No. | | | | | |
| --- | --- | --- | --- | --- | --- | --- |
| | X | | XI | | XI | |
| | FS | FM | FS | FM | FS | FM |
| Hours at 315° C.: | | | | | | |
| 0.5 | *29.6 | *2.7 | 56.5 | 2.4 | 44.6 | 2.3 |
| 100 | 27.6 | 2.4 | 48.4 | 2.4 | 17.6 | 2.2 |
| 250 | 14.7 | 2.3 | 36.7 | 2.4 | | |
| 500 | | | 11.9 | 1.8 | | |

*After 24 hours aging.
FS—flexural strength p.s.i. $\times 10^{-3}$. FM—flexural modulus p.s.i. $\times 10^{-6}$.

From the foregoing description it will be evident that the present invention provides a novel class of cross-linkable aromatic polyimide resinous compositions. The polymeric compositions are easily prepared and permit the production of thermoset resinous materials characterized by outstanding thermal stability. The invention represents, therefore, a decided advance in the production of resinous compositions for high temperature use.

I claim as my invention:

1. A resinous polymeric aromatic polyimide intermediate containing both acetamido and carboxylic acid radical cross-linking sites and having the repeating unit:

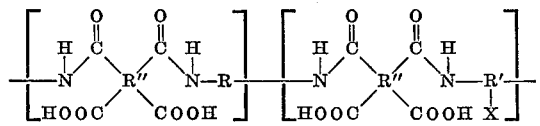

in which R is a divalent carbocyclic aromatic radical, R' is a trivalent carbocyclic aromatic radical, X is selected from the group consisting of acetamido and carboxylic acid radicals, and R" is a tetravalent carbocyclic radical.

2. The polymeric aromatic polyimide of claim 1 wherein R" is

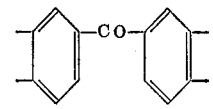

3. The polymeric aromatic polyimide of claim 1 wherein R" is

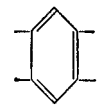

4. A cross-linkable aromatic polyimide containing both acetamido and carboxylic acid radical cross-linking sites and having the repeating unit:

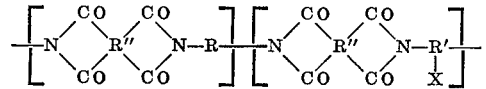

in which R is a divalent carbocyclic aromatic radical, R' is a trivalent carbocyclic aromatic radical, X is selected from the group consisting of acetamido and carboxylic acid radicals, and R" is a tetravalent carbocyclic radical in which the four bonds are so located that the imide rings contain 5 to 6 members.

5. The cross-linkable aromatic polyimide of claim 4 wherein R" is

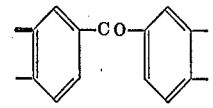

6. The cross-linkable aromatic polyimide of claim 4 wherein R" is

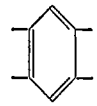

7. The fully cured, amide cross-linked polymer of the aromatic polyimide of claim 4, the amide crosslinks having been formed from the acetamido and carboxylic acid radicals.

8. The fully cured, amide cross-linked polymer of the aromatic polyimide of claim 5, the amide crosslinks having been formed from the acetamido and carboxylic acid radicals.

9. The fully cured, amide cross-linked polymer of the aromatic polyimide of claim 6, the amide crosslinks having been formed from the acetamido and carboxylic acid radicals.

10. A process for preparing an aromatic polyimide intermediate containing both acetamido and carbocyclic acid radical cross-linking sites which comprises mixing together in a solvent an aromatic diamine, a carbocyclic dianhydride, a carbocyclic aromatic diamino acetamido compound and a carbocyclic aromatic diamino carboxylic acid, said mixture being effected over a period of from several minutes to several hours at substantially room temperature.

References Cited

UNITED STATES PATENTS

| | | | |
|---|---|---|---|
| 3,049,518 | 8/1962 | Stephens | 260—78 |
| 3,179,635 | 4/1965 | Frost et al. | 260—78 |
| 3,190,856 | 6/1965 | Lavin et al. | 260—78 |
| 3,299,101 | 1/1967 | Tocker | 260—78 |

WILLIAM H. SHORT, Primary Examiner

L. L. LEE, Assistant Examiner

U.S. Cl. X.R.

161—197, 227; 260—30.8, 32.4, 32.6, 47, 78, 78.4